Nov. 17, 1970   H. J. CAULFIELD ET AL   3,540,791
SIMPLIFIED MULTIPLE IMAGE GENERATION
Filed May 8, 1968   2 Sheets-Sheet 1
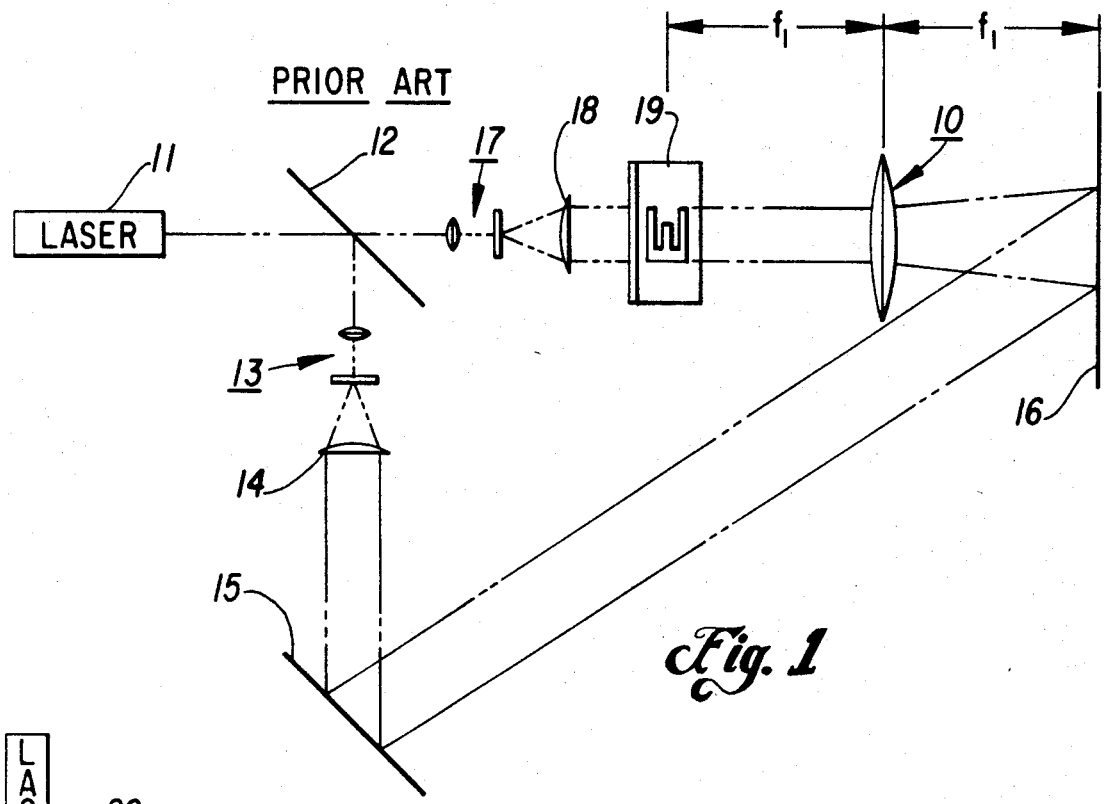
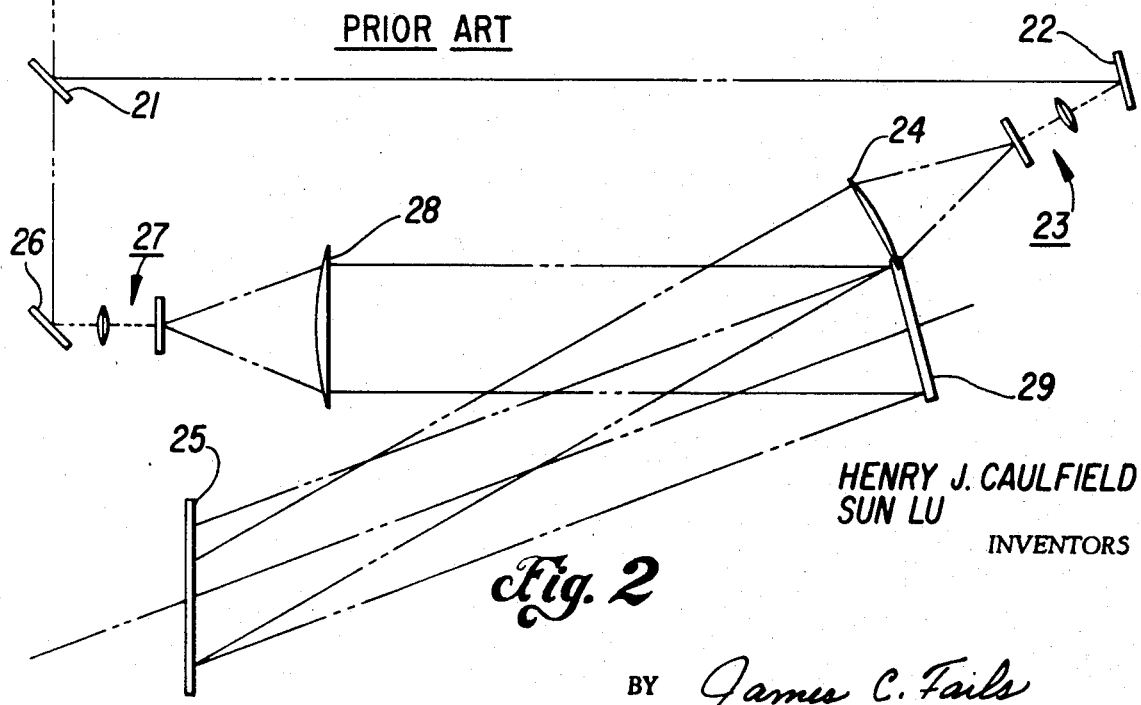
HENRY J. CAULFIELD
SUN LU
INVENTORS
BY James C. Fails
ATTORNEY

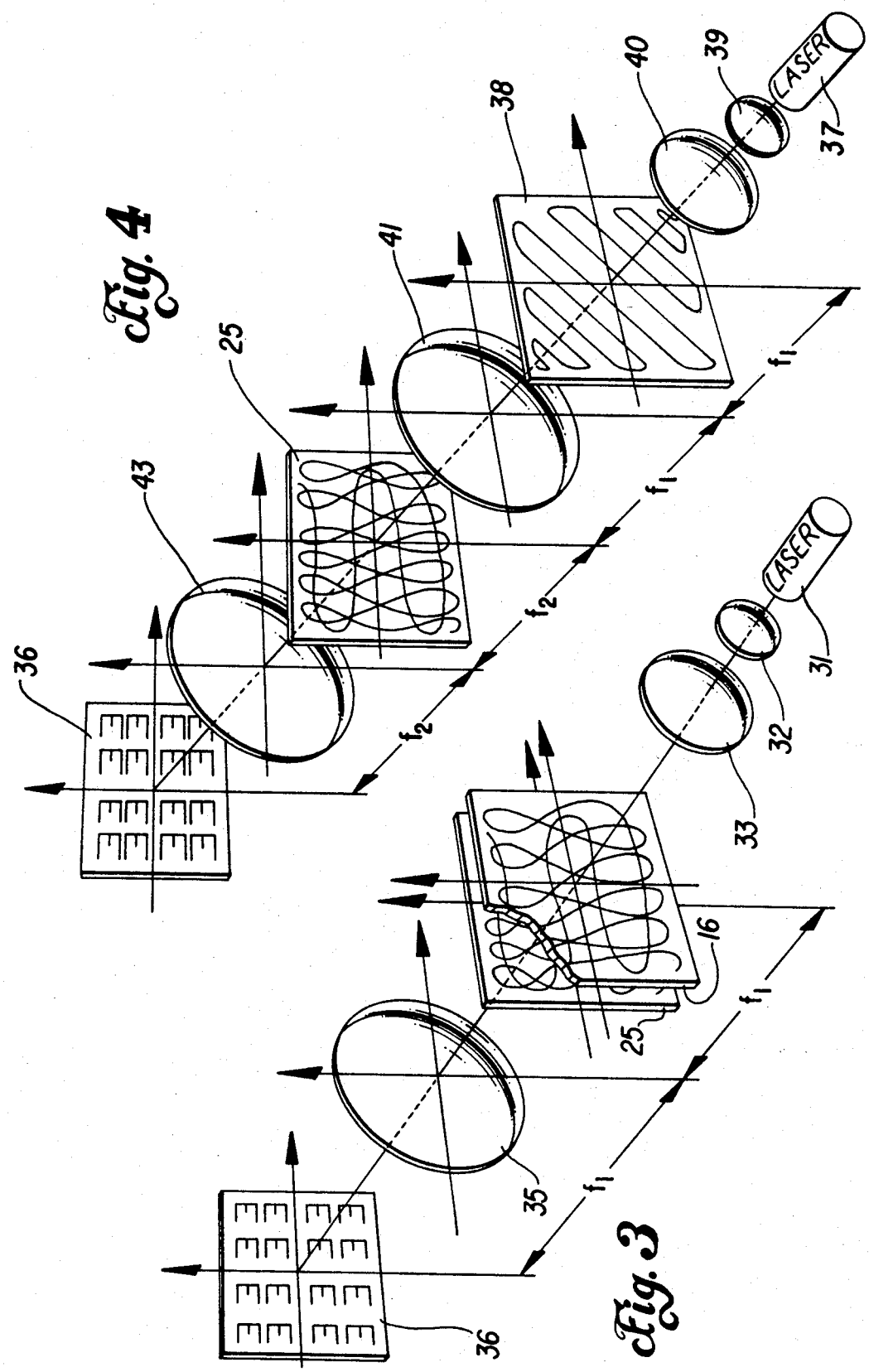

United States Patent Office 3,540,791
Patented Nov. 17, 1970

---

3,540,791
SIMPLIFIED MULTIPLE IMAGE GENERATION
Henry J. Caulfield, Carlisle, Mass., and Sun Lu, Dallas, Tex., assignors to Texas Instruments Incorporated, Dallas, Tex., a corporation of Delaware
Filed May 8, 1968, Ser. No. 727,587
Int. Cl. G02b 27/00
U.S. Cl. 350—3.5                                          1 Claim

ABSTRACT OF THE DISCLOSURE

Apparatus and method for forming multiple images from the image of an object are disclosed. In the method, the multiple images are formed on a recording medium by passing monochromatic light through two holograms and a double convex lens, the first hologram being of the Fourier transform of the light pattern of the image of the object and the second hologram being of the Fourier transform of the light pattern of an array of point sources of light in positions corresponding to the positions of the images to be formed in the multiple image array. In a modification of the method, multiple images are formed by passing monochromatic light through a hologram of the image of the object, a double convex lens, a hologram of the Fourier transform of the light pattern of an array of point sources of light corresponding in position to the array of images to be formed, and a second double convex lens. In both cases the multiple images are formed on a recording medium in number and position determined by the number and position of the point sources in the array of the point sources of light.

---

This invention relates to improvements in the simultaneous production of multiple images of a master image, and more particularly to the simultaneous production of multiple images from a master image using holographic techniques.

The simultaneous generation of high resolution multiple images of a master image can often be of importance. For example, in the production of a number of identical integrated circuits in a single semiconductor slice, an image of the pattern of the circuit configuration is exposed at various locations on a surface of the slice which has been treated, for example, with a photosensitive material. Producing such identical configurations by hand using conventional photomask techniques is time consuming, inaccurate and costly. However, if the configuration of the desired integrated circuit design can be accurately reproduced and conveyed to a photographic plate, for example, the image on this photographic plate, can be, in accordance with the invention, reproduced in number and position called for by the number and position of the integrated circuits to be produced in the slice. Hence, multiple images may be concurrently exposed upon the surface of the semiconductor slice coated with a photosensitive material, thereby preparing the slice in one inexpensive operation for the further processing of the slice in accordance with well-known integrated circuit fabrication techniques.

Another use for a multiple image generation system is in the manufacture of infrared detectors, such as commonly used lead sulfide detectors, on which arrays with as many as one thousand closely spaced elements are fabricated. Commonly, photomasks are constructed from handmade reproductions of the intricate infrared detector arrays to be photoetched into the material. By holographic techniques, however, such photomasks can be easily constructed by exposing onto the undeveloped photomask material multiple images of one handmade image rather than an entire array of images. This holographic method improves reliability, assures accurate element duplication, and eliminates large scale, expensive art work.

One technique for generating multiple images of a master image is described in copending application, Ser. No. 617,349, filed Feb. 20, 1967, by Sun Lu, entitled "Multiple Image Generation," and assigned to the assignee of the present application. The method described therein is generally as follows: Monochromatic light from a light source, such as a laser, illuminates a master image and creates a light disturbance pattern. By a Fourier-producing lens, the Fourier transform of the light disturbance at the master image is formed upon a hologram of an array of points corresponding in number and position to the multiple image desired. A Fourier transform of the pattern of the light passing through and modified by the hologram is produced by a second Fourier-producing lens. The light output of the second lens, an array of multiple images of the master image, is formed upon the element where the multiple images are desired to be registered.

As used in that application (and hereinafter) the term "master image" is used to mean an element having a pattern of opaque, translucent, and intermediate adiaphanous areas representing the image pattern to be reproduced. For example, one such usable master image may be a pattern of an integrated circuit reproduced on a photographic plate with the image of the circuit leads being translucent, the remaining areas being opaque. Another equally usable master image is an actual photograph.

In the above described system, each time the multiple images are desired to be reproduced the master image itself must be included in the apparatus, and, in addition, the master image must be accurately positioned at the focal point of the Fourier-producing lens. The present invention is an improvement of the system; it obviates these requirements and makes the system substantially more flexible.

It is therefore an object of the present invention to provide a method of and apparatus for producing high resolution multiple images of a master image using holographic techniques without requiring the use of the master image each time the multiple image production process is repeated.

Other objects and advantages of the invention will become apparent to those skilled in the art from the following detailed description when read in conjunction with the appended claims, and attached drawings in which:

FIG. 1 is a diagram of a prior art system for producing a Fourier-image hologram;

FIG. 2 is a diagram of a prior art system for producing a Fourier-array hologram;

FIG. 3 is a diagram showing the apparatus of one preferred form of the invention; and FIG. 4 is a diagram showing a second preferred form of the invention.

For clarity in the description of the present invention, and because a lens having the properties of a double convex lens plays an important part in the invention, the light modification properties of such a lens having focal points $f_1$ and $f_2$ are here summarized. In general, the light pattern of an image at focal point $f_1$ is modified by the double convex lens to form an image pattern at focal point $f_2$ having a mathematical relationship to the pattern at $f_1$. If the light pattern at $f_1$ is produced by the incidence of monochromatic light waves on a master image, the light pattern at $f_2$ can be mathematically expressed as the Fourier transform of the pattern of the master image. The light pattern $F(u, v)$ at $f_2$, therefore, is expressed by the equation:

$$F(u, v) = \iint_{-\infty}^{\infty} f(x, y) e^{-i \frac{2\pi}{f_2 \lambda}(ux+vy)} dx dy$$

where:

$f(x, y)$ is the function representing the master image on an $x$–$y$ plane defined at focal point $f_1$, $f_2$ is the focal point distance of the double convex lens on the side opposite $f_1$, $\lambda$ is the wavelength of the monochromatic light, and $F(u, v)$ is the function the light pattern of a $u$–$v$ plane defined at $f_2$, parallel to the $x$–$y$ plane.

For convenience, a lens having the above properties will hereinafter be referred to a Fourier-producing lens, and the operation of producing the pattern of equation $F(u, v)$ will be referred to as forming the Fourier transform of the light pattern. In actual practice, to achieve optimum image quality, a double convex lens is not used, but rather a multi-element well corrected lens system having the light modification characteristics of a double convex lens is used. This, however, does not affect the accuracy of the description and drawings, which refer to and show mere double convex lenses.

In accordance with the system of the invention, a hologram is used on which the Fourier transform of the light pattern created by the incidence of a monochromatic light wave upon the master image is recorded. This hologram is hereinafter referred to as the Fourier-image hologram. It is also common in the art to refer to such a hologram as a Fourier-transform hologram of an image. The method of producing such Fourier-image hologram is described below with reference to FIG. 1. Also used in the system is a hologram of the Fourier transform of the light pattern of an array of points corresponding to the array to be produced. Such array of points may be thought of an an array of "pinholes" in a mask, the aperture of each pinhole being infinitely small. The hologram of the Fourier transform of such array of points is hereinafter referred to as the Fourier-array hologram and one method of producing it is described in connection with FIG. 2. Such a hologram is also commonly referred to in the art as a Fourier-transform hologram of an array of points.

Referring to FIG. 1, the system as shown therein is the same as previously used in the art to produce holograms, including the use of Fourier-producing lens 10. FIG. 1 includes a laser light source 11 generating a laser beam partially reflected by a beam splitter 12. The reflected part of the beam is passed through beam expander 13 and is collimated by lens 14. The expanded wave is then reflected from surface 15 to form the reference wave upon the surface of photographic plate 16 upon which a Fourier-image hologram of the master image 19 will be formed as described hereinafter. At this point it should be noted that the master image 19 is placed to the left of the Fourier-producing lens 10 at a distance equal to the left focal length $f_1$ of the lens, while the photographic plate 16 is placed to the right focal length $f_1$ of said lens, (focal lengths $f_1$ and $f_2$, being the same assuming a symmetrical lens, and being referred to as $f_1$).

Light passing through beam splitter 12 is expanded by beam expander 17 and is collimated by lens 18. The master image 19 is illuminated by the expanded wave and a diffraction pattern is established. The diffraction pattern, at focal point distance $f_1$ from Fourier-producing lens 10, is modified by the lens to produce the Fourier transform of the master image on the surface of photographic plate 16. The simultaneous illumination of the photographic plate 16 by both the reference wave and the light diffracted wave produced by the master image 19 causes an interference pattern to be established on the plate 16 which produces on the plate 16 a Fourier-image hologram of the master image 19. The photographic plate 16 is then developed and treated in accordance with methods well known in the art.

Although several methods are known in the art for producing a Fourier-array hologram, the system of FIG. 2, described in greater detail in the above-identified copending patent application, produces what applicants believe to be the best result. The system is briefly decribed here for the sake of completeness and clarity to particularly point out the production of a hologram of an array of points.

The Fourier-array hologram is made by exposing a plane wave (a wave of light having equal intensity and phase over a plane perpendicular to the direction of propagation of the wave and which is, fortuitously, the light pattern of the Fourier transform of a point) upon a photographic plate, once for each different position that a reproduction of the master image is desired in the final multiple image array. Although the term "array" is used, it is not intended that it be necessarily construed as a formal array such as an array having, for example, nine positions in a symmetrical 3 x 3 pattern. Using the techniques described below, any desired configuration of image positions can be achieved, including a single position anywhere on the plate. Hence, to make a hologram of the Fourier transform of a point, a plane wave and a reference wave are concurrently exposed onto the surface of a recording medium, such as a photographic plate. By changing the angle of incidence of the plane wave, the reference wave being constant, and again exposing the waves upon the photographic plate, the Fourier transform of two differently located points will be recorded. The process of changing the angle of incidence of the plane wave and exposing the photographic plate can be continued until the Fourier transform of the desired array of points has been recorded, the relative positions of the points corresponding to the relative angles of the incidence of the plane wave, up, down, and from side to side, upon the photographic plate.

More specifically and with reference to FIG. 2, the Fourier-array hologram is produced as follows: light generated by laser light source 20 is partially reflected by beam splitter 21 to a reflecting surface 22. After reflection from the surface 22, the beam is expanded by a beam expander 23 and is collimated by a lens 24. This collimated light wave, projected upon photographic plate 25 is the reference wave required to generate an interference pattern on the photographic plate 25 as hereinafter described. Light passing through beam splitter 21 is transmitted to a reflecting surface 26 and is reflected therefrom to a beam expander 27. The light wave from the expander 27 is collimated by a lens 28 and transmitted to the photographic plate 25 by means of an reflecting surface 29 which may be adjusted to change the angle of incidence of the plane wave upon the photographic plate 25. To insure equal intensity images on the photosensitive surface of photographic plate 25, the same exposure time is used for each image position. Remarkedly good image resolution is possible in the systems of FIGS. 3 and 4 when using a hologram produced by the systems of FIG. 2.

When the Fourier-image hologram (produced by the system of FIG. 1) is placed next to the Fourier-array hologram of the array of points (produced by the system of FIG. 2) and monochromatic light is passed through both holograms, the light output, modified by a Fourier producing lens, and projected on a recording medium is an array of images corresponding in position to the points, the Fourier transform of which is recorded on the array hologram. To be noted is the interesting fact that it is unimportant whether the Fourier-image hologram is positioned on the side of the Fourier-array hologram toward or away from the light source.

FIG. 3 shows the diagram of a system for producing multiple images from a Fourier-image hologram of a single image and Fourier-array hologram of an array of points. Such holograms may be, for example, the Fourier-image hologram 16 of FIG. 1 which has the Fourier transform of letter E of the master image 19 recorded thereon and the Fourier-array hologram 25 of FIG. 2 on which is recorded the Fourier transform of an array of points, for example, sixteen points in a four by four array. As described hereinafter, the final result will be an array of sixteen E's projected upon recording medium 36, each E being in the location indicated by the position of a point in the array of points, the Fourier transform of which is recorded on the hologram 25. Because of the optical properties of the lenses, each image will apear upside down (but will not be reversed) and of size determined by the magnification properties of the lenses used.

At this juncture it should be pointed out that on the photographic plate 16 containing the Fourier-image hologram of the E from the master image 19, the letter E is not discernible to the eye. The Fourier transform of the letter E constituting the hologram thereof on the plate 16 consists of light and dark areas representing a plot of the Fourier transform of the pattern of the letter, on appropriate coordinates, in accordance with the formula previously given. The same is also true of the points recorded on the Fourier-array hologram 25.

The Fourier-image hologram 16, prepared in accordance with the method above described in connection with FIG. 1, is illuminated by light from laser beam source 31. The laser beam is expanded by lens 32 and colimated by lens 33 thereby to illuminate a greater area of the holograms. These lenses are not absolutely necessary as the laser beam would form the multiple array desired without them; however, such an intense light in concentrated form might damage the apparatus, and would not produce good image qaulity since only small portions of the holograms would be illuminated.

Light waves passing through the Fourier-image hologram 16 are then transmitted through Fourier-array hologram 25 prepared in accordance with the method described above in connection with FIG. 2. The light output from Fourier-array hologram 25 is then passed through Fourier-producing lens 35 and caused to fall upon the recording medium 36. Such recording medium, for example, may be a photographic plate, or a semiconductor plate on which is a layer of photosensitive material, or even an ordinary viewing screen.

In order to produce the desired array of E's on the image surface 36, the double convex Fourier transform producing lens 35 is positioned such that both Fourier-array hologram 25 and image surface 36 are at the lens focal points indicated by $f_1$, as implied by the above discussion of the proprties of double convex lenses. Again for the sake of clarity, and not at all an aboslute requirement, the lens 25 as shown is assumed to be symmetrical and therefore having equal focal distances, denoted by the character $f_1$. However, should the lens be non-symmetrical and, therefore, having unequal focal distances, it is only necesary that the array hologram 25 or the image hologram 16 and the image recording medium 36 be positioned at such respective unequal distances. As above mentioned, the order which the light wave passes through the array hologram 25 and image hologram 16 is immaterial, the only requirement being that one hologram be positioned at the appropriate focal distance of the lens 35 and the other positioned on the laser beam side of the first hologram.

In accordance with the present invention, a second method for producing an array of images is provided. In this second method, an ordinary hologram (not a Fourier transform hologram) of the master image, made by techniques well known in the art, is used. Light from a monochromatic source is transmitted through the master image hologram positioned at a focal point of a Fourier-producing lens, thereby forming the Fourier transform of the image upon a Fourier-array hologram positioned at the second focal point of the Fourier-producing lens. The light output from the Fourier-array hologram is again modified by a Fourier-producing lens, and the output is an array of images. Here to be noted is the fact that it is unimportant whether a Fourier-image hologram is used with a regular array hologram or a Fourier-array hologram is used with a regular image hologram, but because of the difficulty to obtain a regular hologram of an array of points, the system using a Fourier-array hologram is preferred. Again, because of the optics of the system, the multiple images are unreversed and upside down, and of size determined by the magnification properties of the lenses used.

With reference to FIG. 4, there is shown a diagram of the system just above described for producing an array of images. A regular image hologram 38 is illuminated by monochromatic light from source 37, the light being first expanded by lens 39 and collimated by lens 40. The modified light waves emerging from hologram 38, positioned at the focal distance of the Fourier-producing lens 41, are directed through the lens. The light output from the lens 41 is then passed through Fourier-array hologram 25 which is positioned at the coincident focal points of the focal distance of lens 41 and the focal distance of another Fouier-producing lens 43. The output waves are again modified by the lens 43 thereby producing a second Fourier transform operation on the waves. The output from the Fourier-producing lens 43 is projected upon a recording medium 36, positioned at the second focal distance of Fourier-producing lens 43. On the recording medium 36 is produced the desired array of the image recorded on the ordinary hologram 38.

Especially noteworthy are the variety of functions in which the invention would be particularly useful. For example, the invention would be of particular advantage in producing multiple images in the manufacture of postage stamps or perhaps of Christmas seals. Also, the above mentioned use of simultaneously processing integrated circuit semiconductor slices would be of distinct advantage. One interesting result of the above invention is that multiple images of photographs may be made, the hues of grey, black, and white of a master photograph being faithfully reproduced in the multiple images. This suggests many possible uses in commercial film processing, such as simultaneously making a number of prints of a movie, or, simply, of a single photograph.

Although the invention has been described with a certain degree of particularly, it is to be understeod that the present disclosure has been made only by way of example and that numerous changes in the details of construction and the combination and arrangement of parts may be resorted to without departing from the spirit and scope of the invention.

What is claimed is:

1. Apparatus for forming on a recording medium multiple images of a master image, comprising:
  (a) a laser light source,
  (b) a Fourier-transform hologram of an array of points,
  (c) a Fourier-transform hologram of said master image,
  (d) a Fourier-producing lens, one of said two holograms being positioned at one focal point of said Fourier-producing lens, the other of said two holograms being positioned between said one of said two holograms and said laser light source, and said image recording medium being positioned at the other focal point of said Fourier-producing lens, said light source, two holograms, lens, and recording medium being disposed along a common optical axis whereby light from said laser light source serially traverses said two holograms and said Fourier-producing lens, and impinges upon said image recording medium to form thereon as many images of said master image as there are points on said Fourier-transform hologram of an array of points in the same position and order as said array of points.

References Cited

UNITED STATES PATENTS 3,405,614  10/1968  Lin et al. ........... 350—3.5

OTHER REFERENCES

Lu, Procedings of the IEEE, vol. 56, No. 1, January 1968, pp. 116–117.

DAVID SCHONBERG, Primary Examiner

R. J. STERN, Assistant Examiner

U.S. Cl. X.R.

350—162